United States Patent
Furuno et al.

(10) Patent No.: US 9,522,361 B2
(45) Date of Patent: Dec. 20, 2016

(54) FIXING MEMBER AND MEMBRANE MODULE UNIT

(75) Inventors: Shinsuke Furuno, Toyohashi (JP); Tomoki Kawagishi, Toyohashi (JP); Katsuyuki Yanone, Toyohashi (JP); Yoshihito Nakahara, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 380 days.

(21) Appl. No.: 13/697,558

(22) PCT Filed: May 19, 2011

(86) PCT No.: PCT/JP2011/061548
§ 371 (c)(1),
(2), (4) Date: Jan. 28, 2013

(87) PCT Pub. No.: WO2011/145689
PCT Pub. Date: Nov. 24, 2011

(65) Prior Publication Data
US 2013/0118966 A1    May 16, 2013

(30) Foreign Application Priority Data
May 19, 2010 (JP) ................................. 2010-115478

(51) Int. Cl.
*B01D 61/20* (2006.01)
*B01D 63/06* (2006.01)
(Continued)

(52) U.S. Cl.
CPC .............. *B01D 61/20* (2013.01); *B01D 61/18* (2013.01); *B01D 63/02* (2013.01); *B01D 63/06* (2013.01);
(Continued)

(58) Field of Classification Search
CPC ........... B01D 2313/06; B01D 2313/12; B01D 2315/06; B01D 2321/185; B01D 61/18; B01D 61/20; B01D 63/02; B01D 63/06; B01D 65/00; C02F 2303/16; C02F 3/1273; Y02W 10/15
See application file for complete search history.

(56) References Cited

U.S. PATENT DOCUMENTS

| 5,714,062 A * | 2/1998 | Winkler ................ B01F 3/0412 |
| | | 210/220 |
| 5,916,440 A | 6/1999 | Garcera et al. |
| 2011/0049037 A1* | 3/2011 | Masutani et al. .......... 210/257.2 |

FOREIGN PATENT DOCUMENTS

| CN | 1682064 A | 10/2005 |
| CN | 101238320 A | 8/2008 |
| | (Continued) | |

OTHER PUBLICATIONS

International Search Report dated Jul. 12, 2011 for PCT/JP2011/061548.
(Continued)

*Primary Examiner* — John Kim
(74) *Attorney, Agent, or Firm* — Morgan, Lewis & Bockius LLP

(57) ABSTRACT

A first fixing member which fixes to a membrane module unit a tubular member with a protrusion formed at a tip end or near the tip end for connecting a membrane module of the membrane module unit and a water collecting header to form a filtrate flow path from the membrane module to the water collecting header, the first fixing member includes: a fixing member main body which includes an engaging surface formed at a position at which the fixing member main body engages with the protrusion formed in the tubular (Continued)

member; and a second fixing member which fixes the fixing member main body to the membrane module unit.

8 Claims, 8 Drawing Sheets

(51) Int. Cl.
    *B01D 63/02*     (2006.01)
    *B01D 65/00*     (2006.01)
    *B01D 61/18*     (2006.01)
    *C02F 3/12*     (2006.01)

(52) U.S. Cl.
    CPC ............ *B01D 65/00* (2013.01); *C02F 3/1273* (2013.01); *B01D 2313/06* (2013.01); *B01D 2313/12* (2013.01); *B01D 2315/06* (2013.01); *B01D 2321/185* (2013.01); *C02F 2303/16* (2013.01); *Y02W 10/15* (2015.05)

(56) References Cited

FOREIGN PATENT DOCUMENTS

| | | |
|---|---|---|
| CN | 100484614 C | 5/2009 |
| EP | 2 260 926 A1 | 12/2010 |
| JP | 61-242606 | 10/1986 |
| JP | 63-051907 | 3/1988 |
| JP | 1-203005 | 8/1989 |
| JP | 5-103956 | 4/1993 |
| JP | 10-180050 | 7/1998 |
| JP | 10-180052 A | 7/1998 |
| JP | 2005-205369 | 8/2005 |
| JP | 2007-209949 | 8/2007 |
| JP | 2008-055376 | 3/2008 |
| JP | 2008-188562 A | 8/2008 |
| WO | 2008/139618 A1 | 11/2008 |
| WO | 2009/118785 A1 | 10/2009 |

OTHER PUBLICATIONS

Extended European Search Report dated Jul. 10, 2014 for corresponding EP Application No. 11783623.9.
Office Action issued in counterpart Chinese Patent Application No. 201180034722.3 dated Apr. 30, 2014.
Office Action dated Oct. 3, 2013 for Application No. TW 100117588 (translation of search report included).
Japanese Notice of Allowance issued in Japanese Patent Application No. 2011-525322 on Aug. 11, 2015.

* cited by examiner

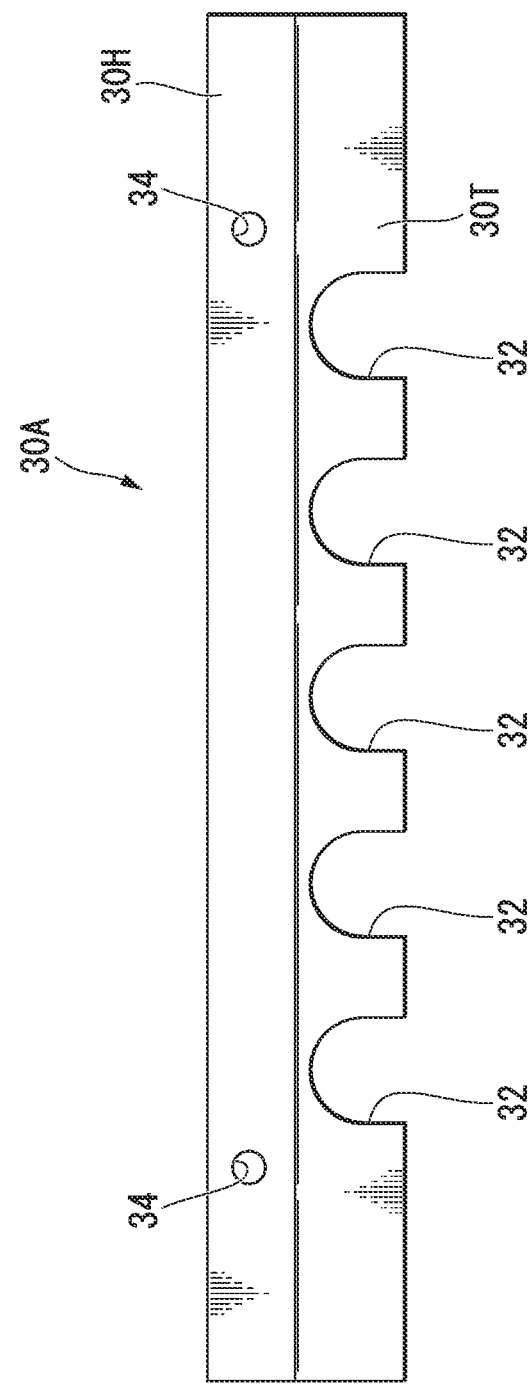

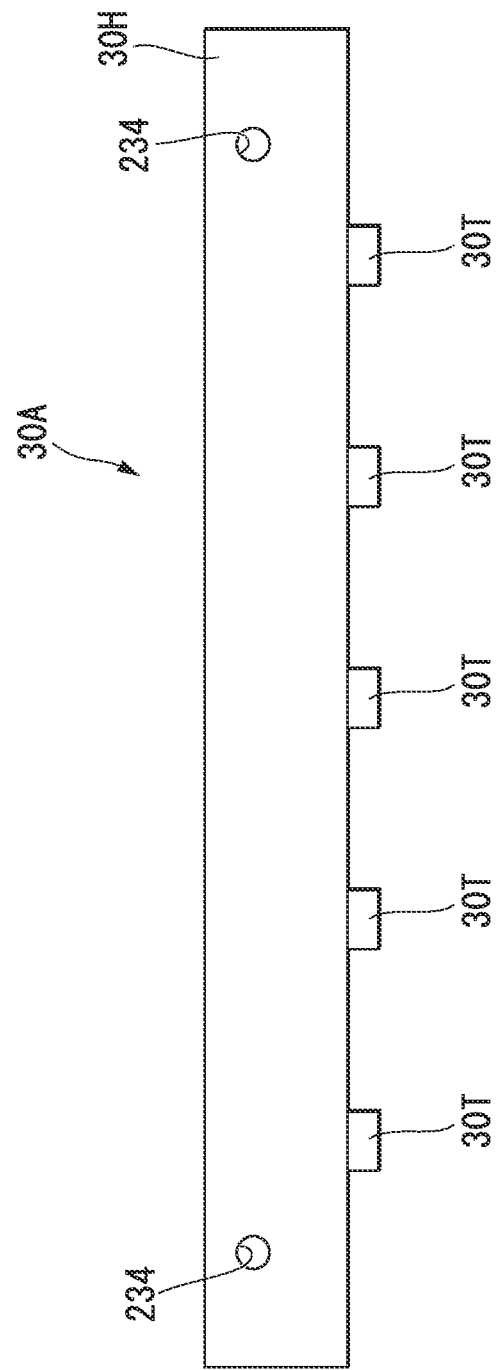

FIXING MEMBER AND MEMBRANE MODULE UNIT

TECHNICAL FIELD

The present invention relates to a fixing member which fixes a connecting member for introducing filtrate from a membrane module used in a separation operations such as water purification and sewage treatment into a water collecting header and a membrane module unit provided with the same.

Priority is claimed on Japanese Patent Application No. 2010-115478, filed May 19, 2010, the content of which is incorporated herein by reference.

BACKGROUND ART

Various methods for performing a solid-liquid separation on treated water using a membrane module with a separation membrane such as a micro-filtration membrane or an ultra-filtration membrane disposed therein have been examined for water treatments such as water purification and sewage treatment. If a filtration treatment is performed on treated liquid using a separation film, it is possible to obtain a filtrate from which solid has been separated and removed to a high degree. Examples of a solid-liquid separation apparatus using such a membrane module include an apparatus in which a plurality of membrane modules, each of which includes a pair of housings for integrally fixing liquid-permeable hollow fiber arranged in a membrane shape such that both ends thereof are accommodated in the housings, are arranged in a dipping tank filled with treated liquid.

According to an apparatus configured such that the housings of each module are connected to a water collecting header via a connecting member and a suctioning apparatus is connected to the water collecting header for suction, filtrate from which solid contained in the treated liquid has been separated and removed on the surface of respective hollow fiber passes through the hollow fiber, is introduced into the housings, collected in the water collecting header via the connecting member, and discharged outside the dipping tank.

If the membrane module and the membrane module unit are increased in size in order to increase a treatment quantity in the solid-liquid separation apparatus using this type of membrane module, the diameter of a filtrate outlet port is increased, and the liquid collecting header is also increased in size in accordance with a quantity of flowing filtrate. On the other hand, the membrane module is required to be compact while also required to enhance the treatment quantity, and therefore, the thickness of the membrane module is designed to be as thin as possible. For this reason, the diameter of the filtrate outlet port is also decreased. Furthermore, in many cases it is possible for one outlet port alone to cause filtrate to smoothly flow, and in such cases, a plurality of filtrate outlet ports are provided in one membrane module.

It is difficult to directly couple the membrane module and the water collecting header, which have been increased in size, due to variations in the dimensions of respective members thereof. Thus, Patent Literatures 1 and 2 have proposed a solid-liquid separation apparatus, a membrane module unit, and a connecting member which are light, compact, and inexpensive while being capable of absorbing a dimension error, in which the connecting member, a housing of a membrane module, and a liquid collecting header can be easily and reliably connected to each other in a slidable and liquid-tight manner, wear and damage are suppressed at a connecting part between the housing of the membrane module or the water collecting header and the connecting member even when the part is influenced by vibration of the membrane module for dispersing solid adhered on the surface of the hollow fiber over a long period, and a solid-liquid separation treatment can be stably performed over a long period.

CITATION LIST

Patent Literature

[PTL 1] Japanese Unexamined Patent Application, First Publication No. 2005-205369
[PTL 2] Japanese Unexamined Patent Application, First Publication No. 2008-55376

SUMMARY OF INVENTION

Technical Problem

However, although the structures described in the above Patent Literatures 1 and 2 have an effect of preventing the connecting member from coming off in plugging and unplugging directions since a cover for preventing the connecting member from coming off is installed, there is a problem in that the cover is less effective in other directions and the connecting member may come off under pressure when being immersed in an activated sludge layer and subjected to a solid-liquid separation treatment. In addition, the cover is also provided for the purpose of protecting the connecting member from external impact, and therefore, there is a problem in that both the prevention of the connecting member from coming off and protection thereof must be enhanced.

The present invention was made in view of the above circumstances, and an object thereof is to provide a fixing member which is capable of preventing a connecting member for connecting a membrane module and a water collecting header from coming off with a simple structure and a membrane module unit provided with the same.

Solution to Problem

According to the present invention, the following configurations are employed as means for solving the problem.

[1] A first fixing member which fixes to a membrane module unit a tubular member with a protrusion provided at a tip end or near the tip end for connecting a membrane module of the membrane module unit and a water collecting header to form a filtrate flow path from the membrane module to the water collecting header, the first fixing member including: a fixing member main body which includes an engaging surface formed at a position at which the fixing member main body engages with the protrusion formed in the tubular member; and a second fixing member which fixes the fixing member main body to the membrane module unit.

[2] The first fixing member according to [1], wherein the fixing member main body has a stepped shape.

[3] The first fixing member according to [1], wherein the fixing member main body has a plate shape.

[4] The first fixing member according to [3], wherein a plate thickness of the fixing member main body is not less than 1 mm and not more than 2 mm.

[5] The first fixing member according to any one of [1] to [4], wherein the engaging surface includes an engaging portion configured by a surface which engages with the protrusion formed in the tubular member in one or more notch peripheral surfaces formed in the fixing member main body and/or in a region set on both sides of each notch.

[6] The first fixing member according to any one of [1] to [5], wherein the protrusion is a flange formed over an entire outer periphery of the tubular member.

[7] The first fixing member according to [6], wherein the engaging surface includes a flange engaging portion which is set in one or more notch peripheral surfaces formed in the fixing member main body and/or on both sides of the notches and includes a flange engaging portion that engages the flange of the tubular member in a region within a substantially semicircular arc of the flange.

[8] The first fixing member according to [6] or [7], further including: a sealing member which is arranged between the flange engaging portion and the flange.

[9] A membrane module unit including: a plurality of membrane modules which are disposed in parallel; water collecting headers; tubular members, each of which includes a protrusion formed at a tip end or near the tip end, for connecting the membrane modules and the water collecting headers to form filtrate flow paths from the membrane modules to the water collecting headers; and first fixing members according to any one of [1] to [8].

[10] The membrane module unit according to [9], wherein the protrusion is a flange formed over an entire outer periphery of the tubular member.

[11] The membrane module unit according to [10], wherein each of the tubular members includes L-shaped tubular members.

Advantageous Effects of Invention

According to the present invention, the first fixing member includes the engaging surface provided at a position at which the first fixing member engages with the protrusion formed at a tip end or near the tip end of the tubular member to press the protrusion with the engaging surface such that movement of the tubular member in plugging and unplugging directions and an outer diameter direction of the tubular member can be restricted, and therefore, it is possible to prevent the tubular member from coming off in any direction with a simple structure.

In addition, since the movement of the tubular member in the plugging and unplugging directions and the outer diameter direction of the tubular member can be restricted by pressing the flange formed in the tubular member in a region within a semicircular arc thereof in a state in which the tubular member is accommodated in a notch, it is possible to prevent the tubular member from coming off in any direction with a simple structure.

Furthermore, since it is also possible to prevent the tubular member from coming off in any direction even at the connecting portion of the tubular member by pressing the flange formed in the tubular member with the first fixing member in the region within the semicircular arc thereof, the movement of the connecting portion in the plugging and unplugging directions can also be restricted at the same time.

In addition, since a plurality of flanges of the tubular members can be fixed at the same time, the fixing member main body can be easily installed.

Moreover, since vibration of the membrane modules can be suppressed, it is possible to prevent wear at a position in contact with the tubular member.

In addition, when a sealing member is provided, it is possible to prevent wear between the fixing member main body and the flange of the tubular member.

Moreover, if the fixing member main body is formed in a stepped shape, the strength of the fixing member main body is enhanced, and the plate thickness can be reduced.

BRIEF DESCRIPTION OF DRAWINGS

FIG. 5A is a diagram showing a fixing member main body of the first fixing member.

FIG. 5C is a diagram showing a fixing member main body of the first fixing member.

DESCRIPTION OF EMBODIMENTS

Hereinafter, description will be given of an embodiment of the present invention with reference to the drawings.

Figure 1:
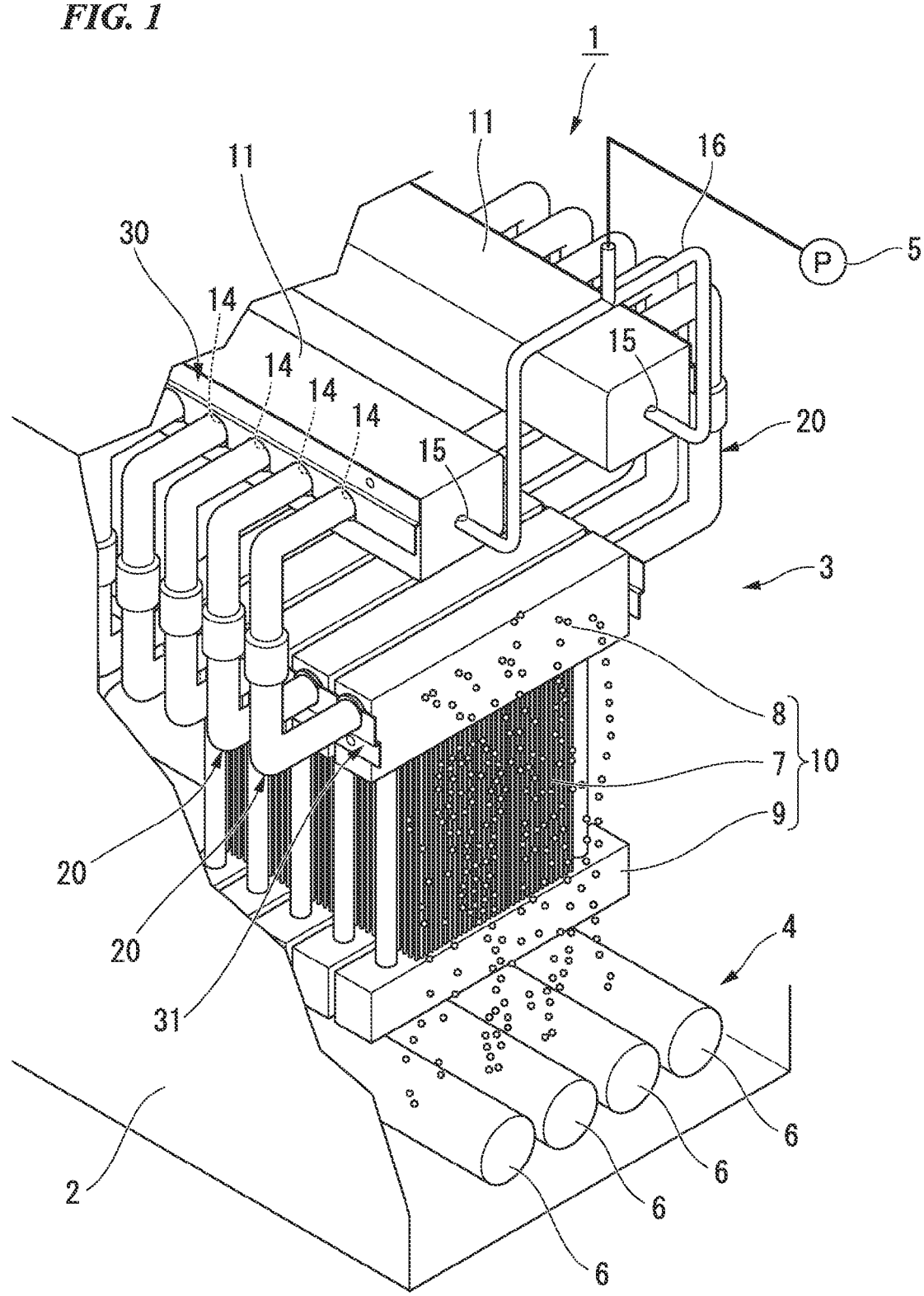
FIG. 1 is an outline configuration diagram of a membrane separation sludge treatment apparatus to which a first fixing member according to an embodiment of the present invention is applied.

FIG. 1 is an outline configuration diagram of a membrane separation sludge treatment apparatus 1 to which a first fixing member according to the embodiment is applied. The membrane separation sludge treatment apparatus 1 includes a membrane module unit 3 provided in a membrane separation tank 2 and an air diffuser 4 for cleaning the membrane. A suctioning pump 5 is connected to the membrane module unit 3, and a blower which is not shown in the drawing is connected to the air diffuser 4.

The air diffuser 4 is provided below the membrane module unit 3 and includes a plurality of air diffusing tube 6 with a tubular body communicating with the blower. The air diffuser 4 discharges air supplied from the blower to a plurality of gas outlet port formed in the air diffusing tube 6. In so doing, air bubbles continuously or intermittently diffused from the gas outlet port of the air diffuser 4 reach the membrane module unit 3 through the treated water and are then discharged from a surface of the water according to the membrane separation sludge treatment apparatus 1.

The membrane module unit 3 includes a plurality of membrane modules 10, each of which includes a pair of housings 8 and 9 which integrally fix multiple liquid-permeable hollow fiber membranes 7 arranged such that both ends thereof are respectively accommodated in the housings 8 and 9, and a pair of water collecting headers 11 which are disposed above each membrane module 10 and connected to the housing 8 with tubular shaped connecting members 20.

A plurality of fine pores are formed in the hollow fiber membranes 7, and the membrane module unit 3 performs solid-liquid separation on the treated water and obtains treated water by suctioning and filtering the treated water in the membrane separation tank 2 by the suctioning pump 5 through the fine pores in the hollow fiber membranes 7.

Figure 2:
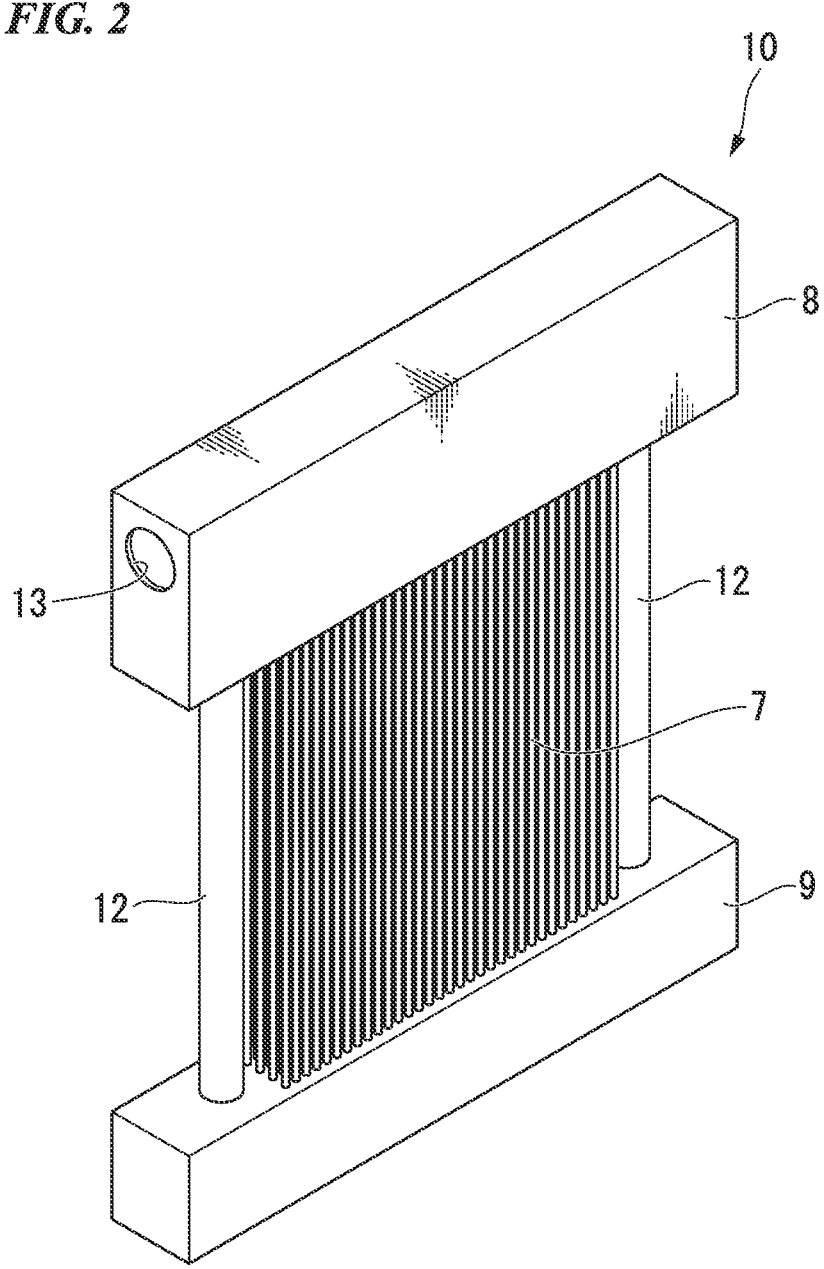
FIG. 2 is a perspective view of a membrane module in a membrane module unit of the membrane separation sludge treatment apparatus.

As shown in FIG. 2, liquid guiding tubes 12 are provided between the pair of housings 8 and 9 on both sides of the hollow fiber membranes 7, and the liquid guiding tubes 12 maintain a space between the pair of housings 8 and 9, support the hollow fiber membranes 7, and function as flow paths of the filtrate collected in the housing 9 to the housing 8. The lower end of the hollow fiber membranes 7 communicates with the housing 9. The housings 8 and 9 have hollow structures, and filtrate outlet ports 13 which can be connected to the connecting members 20 are provided on both sides of the housing 8 disposed above.

On the other hand, referring to FIG. 1, the water collecting headers 11 also have hollow structures and are respectively arranged at both ends of the membrane module 10 such that the longitudinal direction thereof matches a direction which is perpendicular to the longitudinal direction of the housings 8 and 9. A plurality of connecting ports 14 which can be connected to the connecting members 20 are formed on one side surface of each water collecting header 11, and the plurality of connecting ports 14 are opened in the same direction as a direction of the filtrate outlet port 13 formed in the housing 8 at constant intervals along a direction in which the plurality of membrane modules 10 are sequentially provided. The filtrate introduced from the housings 9 into the housings 8 through the liquid guiding tubes 12 passes through the connecting members 20 and is introduced into the water collecting headers 11. In addition, an outlet port 15 for discharging the filtrate is formed on one end of each water collecting header 11 in the longitudinal direction, a tubular body 16 is connected to the outlet port 15, and the tubular body 16 is connected to the suctioning pump 5.

Figure 3:
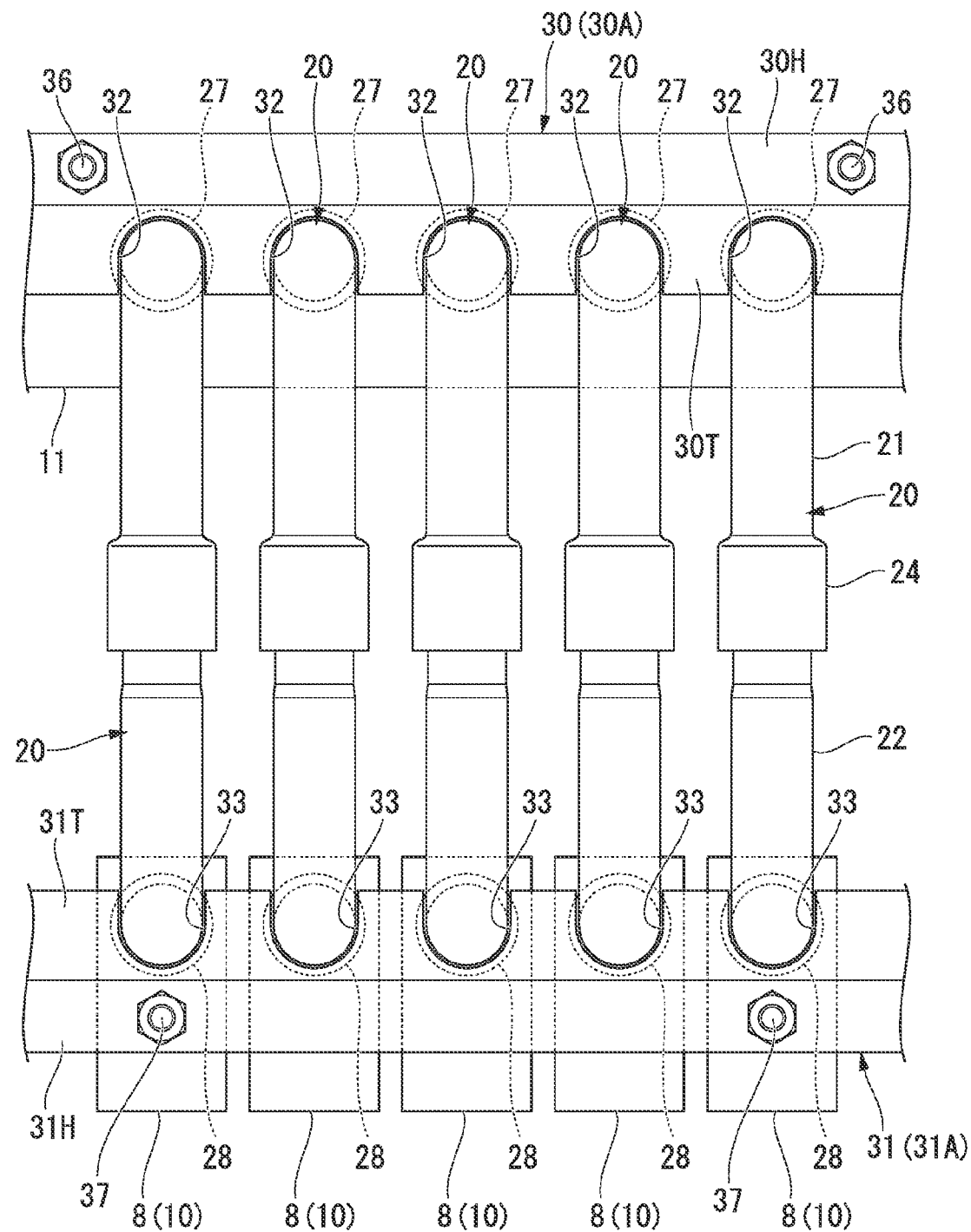
FIG. 3 is a side view of the membrane module unit when the first fixing member is attached thereto.
Figure 4:
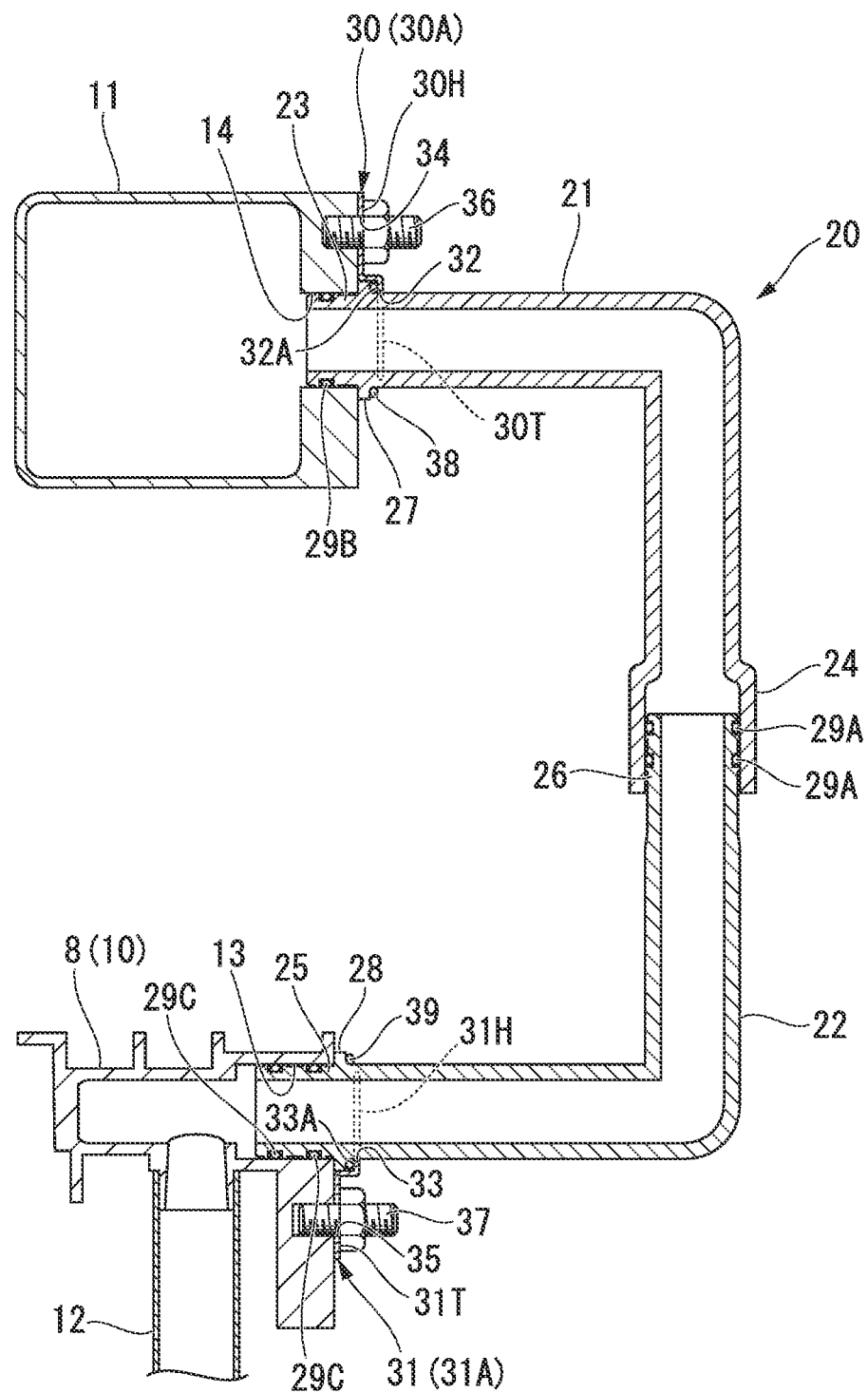
FIG. 4 is a vertical cross-sectional view of the membrane module unit when the first fixing member is attached thereto.

Referring to FIGS. 3 and 4, each of the connecting members 20 is configured by a header-side L-shaped member 21 and a module-side L-shaped member 22, and the header-side L-shaped member 21 has an L-shaped hollow tubular shape and includes a connecting portion 23 with the connecting port 14 of the water collecting header 11 and a connecting portion 24 with the module-side L-shaped member 22. The module-side L-shaped member 22 has an L-shaped hollow tubular shape and includes a connecting portion 25 with the filtrate outlet port 13 provided in the housing 8 of the membrane module 10 and a connecting portion 26 with the header-side L-shaped member 21.

A disk-shaped flange 27 extending in a radius direction is formed in the proximity of a tip end of the header-side L-shaped member 21 on the side of the connecting portion 23, and a disk-shaped flange 28 extending in a radius direction is formed at an end of the module-side L-shaped member 22 on the side of the connecting portion 25. Although the flanges 27 and 28 are separated from the tip ends of the connecting member 20 and are formed in the proximity or vicinity of the tip ends in the embodiment, a configuration in which the flanges 27 and 28 are formed at the tip ends is also applicable.

The proximity or vicinity of each tubular member, at which each flange is formed, means a region from the tip end of the connecting portion 23 of the header-side L-shaped member 21 to a flange engaging portion 32A or a notch portion 32 or a region from the tip end of the connecting portion 25 of the module-type L-shaped member 22 to a flange engaging portion 33A or a notch portion 33. Here, the distance of the region from the tip end of the connecting portion 23 of the L-shaped member 21 is appropriately differentiated depending on a size of the membrane module unit or rigidity of the member and is preferably set to approximately 50% or less of the outer diameter of the tubular member.

In addition, although the flanges respectively provided over the entire outer periphery of the tubular members are described in the embodiment, the present invention is not limited to such flanges, and protrusions which are partially or entirely provided around the outer periphery of the tubular members and are brought into contact with the engaging surface of the first fixing member thereby to easily prevent the tubular members from dropping may be employed. Various shapes can be employed for the protrusions.

The connecting member 20 is configured such that the connecting portion 24 of the header-side L-shaped member 21 is fitted onto the connecting portion 26 of the module-side L-shaped member 22 to thereby cause the hollow parts to form one flow path through which the filtrate flows. In addition, in a coupled state in which the header-side L-shaped member 21 and the module-side L-shaped member 22 are coupled to each other, the connecting portion 23 of the header-side L-shaped member 21 is connected to the water collecting header 11, and the connecting portion 25 of the module-side L-shaped member 22 is connected to the housing 8 of the membrane module 10. The connecting member 20 is designed such that the posture thereof is stably maintained by causing the fixing member 30 to externally engage with the flange 27 formed on the side of the connecting portion 23 of the header-side L-shaped member 21 and causing the fixing member 31 to externally engage with the flange 28 formed on the side of the connecting portion 25 of the module-side L-shaped member 22.

Here, grooves are formed at a part at which the connecting portion 24 of the header-side L-shaped member 21 is fitted onto the connecting portion 26 of the module-side L-shaped member 22, a part at which the connecting portion 23 of the header-side L-shaped member 21 is connected to the water collecting header 11, and at a part at which the connecting portion 25 of the module-side L-shaped member 22 is connected to the housing 8 of the membrane module 10, and sealing members 29A, 29B, and 29C formed of elastic bodies are respectively provided as shown in FIG. 4.

In addition, the header-side L-shaped member 21 and the module-side L-shaped member 22 are preferably resin molded articles since resin molded articles are relatively inexpensive and are easily molded, resin molded articles obtained by molding resin can be used, and a molding method can be appropriately selected from known resin molding methods such as injection molding. The resin used for the resin molded articles can be appropriately selected in consideration of a use environment, workability, and the like. Examples thereof include thermoplastic resin such as vinyl chloride resin, polyolefin resin, polystyrene resin, ABS resin, polycarbonate resin, polyamide resin, polyester resin, modified-polyphenylene ether resin, and polyacetal resin. Such resins can be used singly or in combination depending on a use purpose.

Figure 5B:
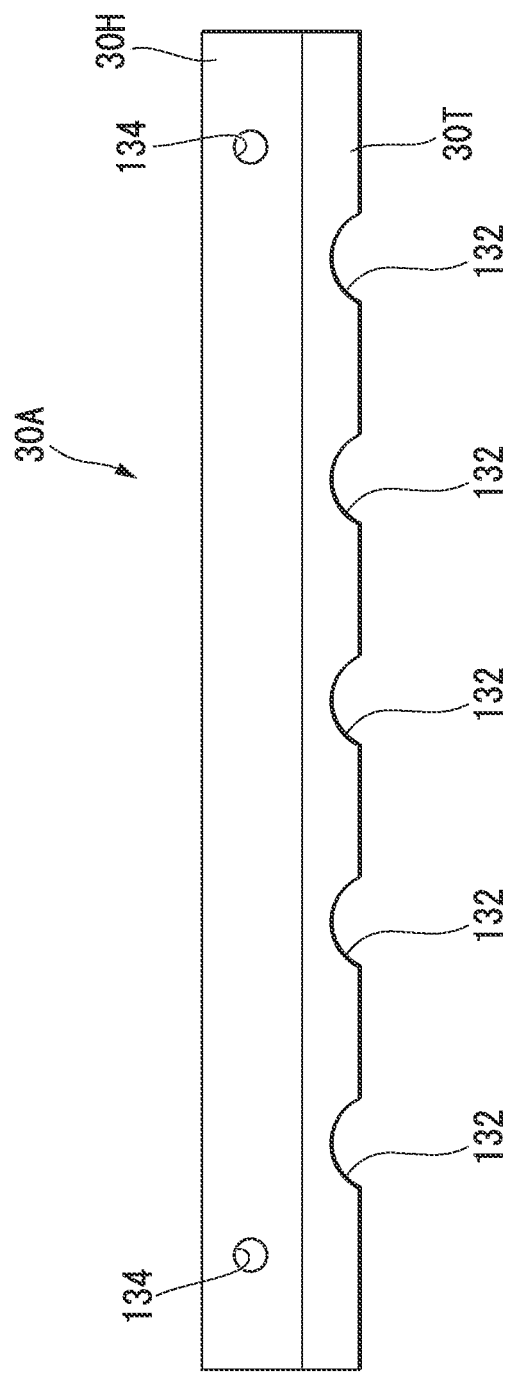
FIG. 5B is a diagram showing a fixing member main body of the first fixing member.

Referring to FIGS. 5A, 5B, 5C, and 6, a fixing member 30 includes a fixing member main body 30A which is a plate-shaped member and bolts 36 (FIGS. 3 and 4), and a fixing member 31 includes a fixing member main body 31A which is a plate-shaped member and bolts 37 (FIGS. 3 and 4). The fixing member main body 30A and the fixing member main body 31A respectively include a plurality of notch portions 32, 33, and 132 which have shapes capable of accommodating the connecting members 20 from the outer peripheral side thereof and a plurality of flange engaging portions 32A and 33A (see FIG. 4) which are set on both sides of the notch portions 32, 33, and 132 in a plate thickness direction of the fixing members 30 and 31 and engage with the flanges 27 and 28 in regions within approximately semicircular arcs of the flanges 27 and 28, or otherwise, the fixing member main body 30A and the fixing member main body 31A do not include the notch portions and include only a plurality of flange engaging portions 32A and 33A as shown in FIG. 5C.

The plurality of notch portions 32, 33, and 132 are respectively formed in the fixing member main body 30A and the fixing member main body 31A so as to simultaneously fix the flanges 27 and 28 of the connecting members 20 connected to the plurality of sequentially provided membrane modules 10. In addition, since a single fixing member main body 31A is substantially the same as the fixing member main body 30A, only the fixing member main body 30A is shown and the fixing member main body 31A is omitted in FIGS. 5A, 5B, and 5C.

As shown in FIG. 4, the fixing member main body 30A and the fixing member main body 31A have stepped shapes (crank shapes), bolt insertion holes 34 and 35 are provided in flat surfaces 30H and 31H, each of which is on one side of the stepped shape, and the notch portions 32 and 33 are formed on the flat surfaces 30T and 31T, each of which is on the other side of the stepped shape. The bolts 36 and 37 are respectively inserted into the bolt insertion holes 34 and 35, and the bolts 36 are fastened to the wall of the water collecting header 11 so as to fix the fixing member main body 30A to the water collecting header 11. In addition, the bolts 37 are fastened to the wall of the housing 8 of the membrane module 10 so as to fix the fixing member main body 31A to the housing 8.

Figure 6:
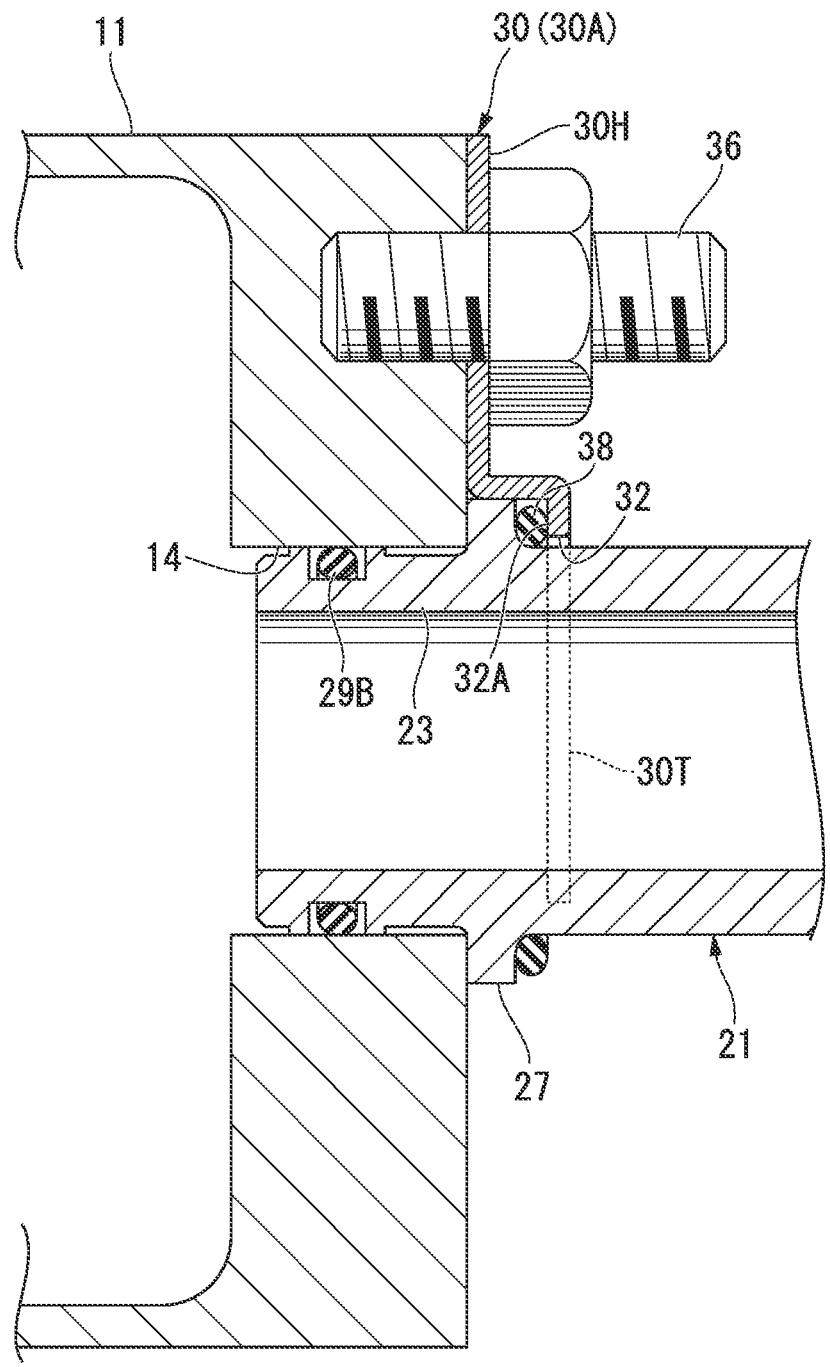
FIG. 6 is an enlarged cross-sectional view of the main parts in FIG. 4.

Meanwhile, referring to both FIGS. 4 and 6, the flange engaging portion 32A is engaged with the flange 27 of the connecting member 20 with the sealing member 38 formed of an elastic body and arranged in the periphery of the connecting member 20 interposed therebetween, and the flange engaging portion 33A is engaged with the flange 28 of the connecting member 20 with the sealing member 39 formed of an elastic body and arranged in the periphery of the connecting member 20 interposed therebetween, on the other flat surfaces 30H and 31H of the fixing member main body 30A.

Referring to FIGS. 3, 5A, and 5B, the notch portions 32, 33, and 132 are formed into arc shapes, and more specifically, formed into semi-arc shapes (shapes with arc surfaces of approximately 180°) such that the flanges 27 and 28 can be pressed with the flange engaging portions 32A and 33A toward the sides of the water collecting header 11 and the housing 8 in regions within the approximately semicircular arcs (regions within the semicircular arcs at the inner peripheral ends of the flanges 27 and 28 in a precise sense) in a state in which the tubular parts of the connecting members 20 are accommodated in the notch portions 32 and 33 for the purpose of reliability in preventing the connecting members 20 from coming off. Since the membrane modules 10 are installed at constant intervals in the membrane module unit 3, the notch portions 32 and 33 are formed at constant intervals so as to match the positions of the connecting members 20. Although the notch portions 32 and 33 are formed into semi-arc shapes and the notch portions 132 are formed into short arc shapes in the embodiment, it is possible to favorably press the flanges 27 and 28 even if the notch portions are formed into V shapes, U shapes, or squared U shapes.

Referring to FIGS. 3, 4, and 5C, the flange engaging portions 32A and 33A are set so as to press the flanges 27 and 28 in regions within substantially semicircular arcs (regions within semicircular arcs at inner peripheral ends of the flanges 27 and 28 in a precise sense) on the sides of the water collecting header 11 and the housing 8 for the purpose of reliability in preventing the connecting member 20 from coming off Since notch portions are not provided in FIG. 5C, the other flat surfaces 30T and 31T function as flange engaging portions. Although each flange engaging portion is formed into a rectangular shape in the embodiment, a flange engaging portion with a shape such as a convex polygonal shape other than the circular shape and the rectangular shape can also favorably press the flanges 27 and 28.

Here, although it is preferable that the second fixing members are bolt fastened to the water collecting header 11 and the membrane module 10 of the fixing member main bodies 30A and 31A with the bolts 36 and 37 as in the embodiment in consideration of reliability in fixability, the present invention is not limited thereto. In addition, although metal, resin, fiber reinforced resin, and the like can be applied as materials of the fixing member main bodies 30A and 31A, it is preferable that the fixing member main bodies 30A and 31A be formed into stepped shapes obtained by bending metal plates in consideration of strength and ease of fabrication. The strength of the members is enhanced by bending the metal plates, and the plate thicknesses of the fixing member main bodies can be reduced. Thus, fabrication is also facilitated. In addition, the plate thicknesses of the fixing member main bodies 30A and 31A are preferably not less than 1 mm and not more than 2 mm in consideration of compactness. Moreover, it is preferable to use O rings, V rings, packings, and the like for the sealing members 38 and the sealing members 39. Although the materials of the sealing member 38 and the sealing member 39 are not particularly limited, it is possible to appropriately make a selection from nitrile rubber, styrene rubber, silicon rubber, ethylene-propylene rubber, chloroprene rubber, fluorine-contained rubber, and the like.

Although a structure in which the fixing members 30 and 31 are installed on both sides of the water collecting header 11 and the membrane module 10 of the connecting member 20 in view of reliability in preventing the connecting member 20 from coming off and vibration alleviation of the membrane module 10 is employed in the embodiment, the fixing member may be installed on one side. Moreover, although the plurality of notch portions 32 and 33 are provided in the fixing member main bodies 30A and 31A in order to simultaneously fix the plurality of connecting members 20 of the plurality of membrane modules 10, the number of notch portions is preferably about 10 from the viewpoint of the sizes of the fixing members 30 and 31 and attachment workability.

According to the fixing members 30 and 31 of the aforementioned embodiment, it is possible to prevent the connecting member 20 from coming off in any direction with a simple structure since movement of the connecting member 20 in plugging and unplugging directions and an outer diameter direction of the connecting member 20 can be restricted by pressing the flanges 27 and 28 formed in the connecting member 20 in regions within semicircular arcs thereof on the sides of the water collecting header 11 and the membrane module 10 in a state in which the tubular connecting member 20 is accommodated in each of the notch portions 32, 33, and 132 of the fixing member main bodies 30A and 31A.

According to the fixing members 30 and 31 of the embodiment, it is possible to prevent the connecting member 20 from coming off in any direction with a simple structure even when the notch portions are not provided since the movement of the connecting member 20 in the plugging and unplugging directions and an outer diameter direction of the connecting member 20 can be restricted by pressing the flanges 27 and 28 of the tubular connecting member 20 in the regions within the semicircular arcs thereof on the sides of the water collecting header 11 and the membrane module 10 by using the flange engaging portions of the fixing member main bodies 30A and 31A.

In addition, installation is facilitated since the plurality of flanges 27 and 28 of the connecting members 20 can be fixed at the same time.

Furthermore, it is possible to prevent wear at parts in contact with the connecting members 20 since vibration of the membrane module 10 can be suppressed.

The fixing members 30 and 31 are provided with sealing members 38 and 39 which are arranged at spaces from the flanges 27 and 28 and formed from elastic bodies in the embodiment, and with such a configuration, it is possible to prevent wear between the fixing member main bodies 30A and 31A and the flanges 27 and 28. In addition, since the fixing member main bodies 30A and 31A have stepped shapes, it is possible to enhance strength (secure the cross-sectional areas) of the fixing member main bodies 30A and 31A and to thereby reduce the plate thicknesses.

EXAMPLES

In an example described below, specific materials and dimensions of the fixing members 30 and 31 according to the embodiment were set, the fixing members 30 and 31 were attached to the membrane module unit 3, and a state of the membrane module unit 3 after an operation was observed.

SUS 304 plates were used as the materials of the fixing member main bodies 30A and 31A, notch portions 32 and 33 were respectively formed at 10 positions in order that flanges 27 and 28 of 10 connecting members 20 can be respectively fixed at 10 positions at the same time, and bolt insertion holes 34 and 35 for fixing the fixing member main bodies 30A and 31A with bolts were processed at appropriate positions. Then, the fixing member main bodies 30A and 31A were formed into stepped shapes by bending the plates to enhance the strength, and the plate thickness of 1 mm was employed.

The sealing members 38 and 39 formed by O rings made of nitrile rubber (NBR) (JIS reference No. P24) were attached between the flanges 27 and 28 of the connecting member 20 and the fixing member main bodies 30A and 31A. Then, the fixing member main bodies 30A and 31A were installed at the flanges 27 and 28 on the sides of the water collecting header 11 and the membrane module 10 of the connecting member 20, and the fixing member main bodies 30A and 31A were fixed with the bolts 36 and 37.

In relation to each connecting member 20, both the header-side L-shaped member 21 and the module-side L-shaped member 22 were obtained by injection molding of ABS resin (product name: Cycolac SW3 manufactured by UMG ABS), an L-shaped tubular hollow member with a circular cross section with an inner diameter of 1.5 cm and an outer diameter of 2.5 cm was manufactured. Sealing members formed by O rings made of nitrile rubber (NBR) (JIS reference No. P20) were attached as the sealing member 29A at the fitting parts between the connecting portion 24 of the header-side L-shaped member 21 and the connecting portion 26 of the module-side L-shaped member 22 to form a coupled body.

Ten membrane modules 10, each of which has filtrate outlet ports 13 (circular through holes with cross sections with diameters of 2.7 cm) at two positions above the housing 8, were prepared, and the connecting members 20 were respectively connected to the membrane modules 10 and the connecting ports 14 of the water collecting headers 11. Each membrane module 10 was produced by injection molding of ABS resin (product name: Cycolac SW3 manufactured by UMG ABS) into a size of 50 cm wide, 80 cm high, and 3 cm thick so as to have the housings 8 and 9 with sizes of 50 cm wide, 6 cm high, and 3 cm thick. In addition, as the sealing members 29B and 29C which were provided in the grooves at the connecting part between the connecting portion 23 of the header-side L-shaped member 21 and the water collecting header 11 and the connecting part between the connecting portion 25 of the module-side L-shaped member 22 and the housing 8 of the membrane module 10, sealing members formed by O rings made of nitrile rubber (NBR) (JIS reference No. P20) were attached.

In relation to each water collecting header 11, ten connecting ports 14 were welded at intervals of 45 mm to a square pipe made of stainless with a thickness of 2 mm (SUS304) with a square cross section of 5 cm on a side, one end of the square pipe was blocked, and the filtrate outlet port 15 was welded to the other end thereof.

The membrane module unit 3 configured as described above was immersed into the membrane separation tank 2 which was an activated sludge layer and subjected to solid-liquid separation processing, and the pressure applied during the processing operation was set to 100 Kpa.

The membrane module unit 3 was pulled out from the membrane separation tank 2 after the operation for 60 days to observe the connecting members 20, and it was found out that the connecting members 20 did not come off and that no wear due to vibration was observed in the connecting members 20. In addition, it was also confirmed that the fixing members 30 were not deformed.

In a comparative example, the same confirmation as in the example was made in a state in which the fixing members 30 and 31 were not attached, and it was found out that the connecting members 20 came off under pressure of 40 Kpa during the processing operation.

In still another comparative example, a cover with a same shape as that used in Patent Literature 1, namely a plate-shaped cover in which a plurality of planes form convex shapes by forming a crank was attached to the connecting members 20 so as to cover the group of the connecting members 20 with a plurality of planes in the same manner as in Patent Literature 1, the same confirmation as that in the example was made, and it was found out that the connecting members 20 came in about one week after the start of the processing operation due to influences of vibration and movement of elements and sliding motions of the connecting members 20 in directions other than the plugging and unplugging directions. In addition, the connecting members 20 interfered with the cover at the time of coming off, and wear was observed in the connecting members.

INDUSTRIAL APPLICABILITY

Reference Signs List

Since the fixing member according to the present invention can prevent the connecting member that connects the membrane module and the water collecting header from coming off with a simple structure, the fixing member can be preferably used in the membrane module unit provided with the same.

Reference Numerals

3: membrane module unit
10: membrane module

11: water collecting header
20: connecting member (tubular member)
27, 28 flange
30, 31: first fixing member
30A, 31A: fixing member main body
32, 33, 132: notch portion (notch)
32A, 33A: flange engaging portion
36, 37: bolt (second fixing member)
38, 39: sealing member

The invention claimed is:

1. A first fixing member which fixes a tubular member with a protrusion provided in a proximity of a distal end of the tubular member for connecting a membrane module of the membrane module unit and a water collecting header to form a filtrate flow path from the membrane module to the water collecting header, on a membrane module unit, the first fixing member comprising:
    a fixing member main body which includes an engaging surface formed at a position at which the fixing member main body engages with the protrusion formed in the tubular member; and
    a second fixing member which fixes the fixing member main body to the membrane module unit,
    wherein the fixing member main body has a stepped shape with crank shape having two parallel plates connected by a vertical plate, formed by bending a plate.

2. The first fixing member according to claim 1, wherein the fixing member main body has a plate shape.

3. The first fixing member according to claim 2, wherein a plate thickness of the fixing member main body is not less than 1 mm and not more than 2 mm.

4. The first fixing member according to claim 1, wherein the engaging surface includes an engaging portion configured by a surface which engages with the protrusion formed in the tubular member in one or more notch peripheral surfaces formed in the fixing member main body and/or in a region set on both sides of each notch.

5. The first fixing member according to claim 1, wherein the protrusion is a flange formed over an entire outer periphery of the tubular member.

6. The first fixing member according to claim 5, wherein the engaging surface includes a flange engaging portion which is set in one or more notch peripheral surfaces formed in the fixing member main body and/or on both sides of the notches and includes a flange engaging portion that engages the flange of the tubular member in a region within a substantially semicircular arc of the flange.

7. The first fixing member according to claim 5, further comprising:
    a sealing member which is arranged between the flange engaging portion and the flange.

8. The first fixing member according to claim 6, further comprising:
    a sealing member which is arranged between the flange engaging portion and the flange.

* * * * *